M. Van Slyke and D. W. Wood.
Car-Coupling. REISSUED JUL 12 1870
4073
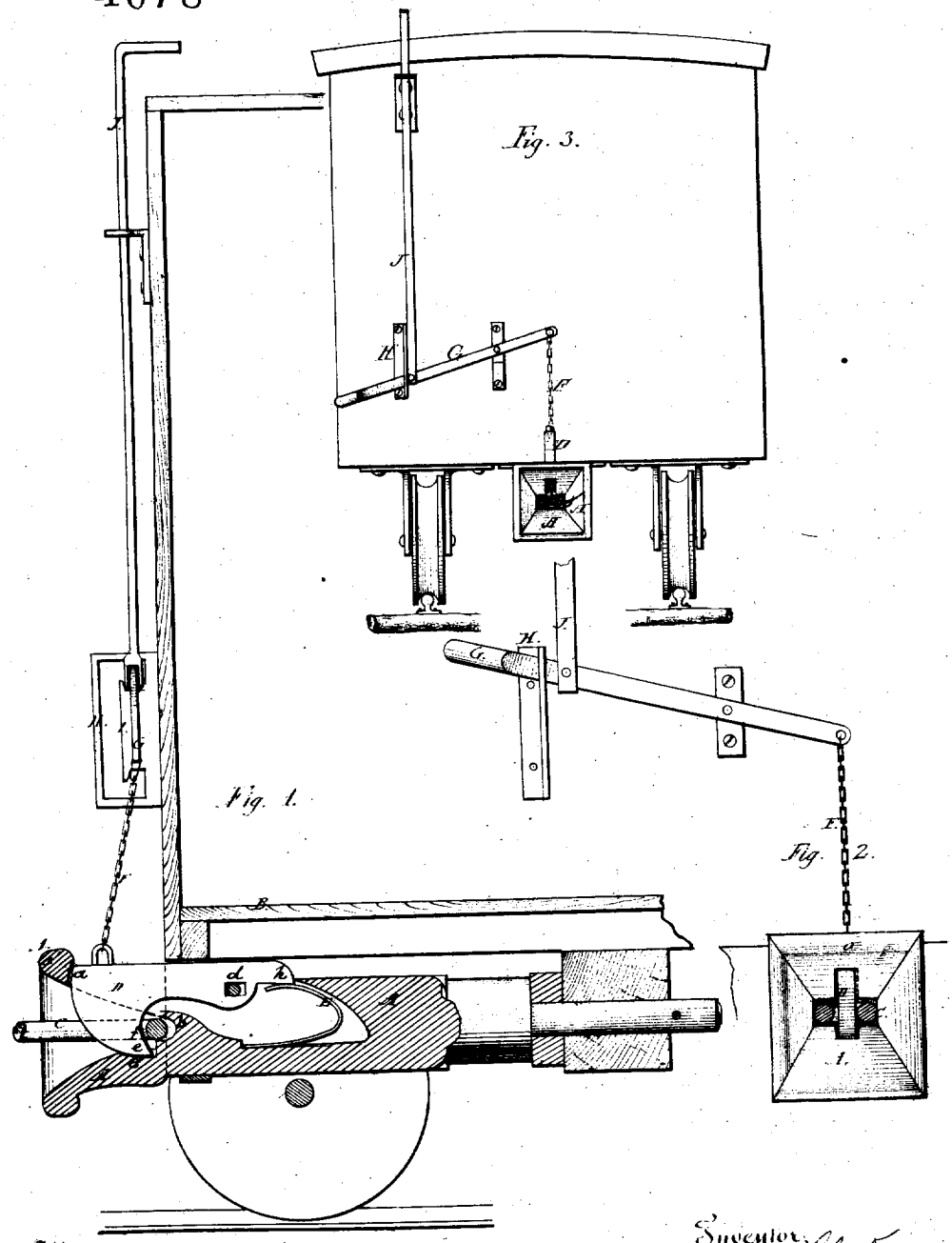
Attest;
L. S. Maber
Geo. W. Maber
Inventor;
M. Van Slyke
D. W. Wood
per M M M & Co
Attorneys

United States Patent Office.

MANUEL VAN SLYKE AND DAVID WOOLSEY WOOD, OF ROME, NEW YORK.

*Letters Patent No.* 96,514, *dated November* 2, 1869; *reissue No.* 4,073, *dated July* 12, 1870.

IMPROVEMENT IN CAR-COUPLING.

The Schedule referred to in these Letters Patent and making part of the same.

*To all whom it may concern:*

Be it known that we, MANUEL VAN SLYKE and DAVID WOOLSEY WOOD, of Rome, in the county of Oneida and State of New York, have invented a new and useful Improvement in Car-Coupling; and we do hereby declare that the following is a full, clear, and exact description thereof, which will enable others skilled in the art to make and use the same, reference being had to the accompanying drawings forming part of this specification.

Figure 1 is a side sectional view of our improved car-coupling.

Figure 2 is a front elevation, showing the coupling-hook raised.

Figure 3 is a similar elevation, showing the coupling-hook closed.

Similar letters of reference indicate corresponding parts.

Our invention has for its object an improvement in car-coupling; and

It consists in the construction and combination of parts, as hereinafter more fully described.

A is the bumper-head, which may be secured to the car B in the ordinary manner.

D is the coupling-hook, which is placed in a slot in the upper side of the bumper-head A.

The coupling-hook is secured to the bumper-head by means of a pivot-pin, *d*, which passes laterally through the bumper-head, and through a longitudinal slot or opening in the coupling-hook, as shown. The slot permits of a longitudinal movement of the hook D.

When the coupling-hook D is closed, as shown in the drawings, its under surface comes in contact with or meets the surface of the bumper-head, and the meeting surfaces of the coupling-hook and bumper-head are made in a peculiar form, so as to resist the longitudinal strain of the link C against the coupling hook D.

It will be observed that the lower portion *e* of the coupling-hook is convex, and fits into a corresponding concave cavity, *e'*, of the bumper-head.

The meeting-surfaces *e e'* form a lock to hold the coupling-hook D, and assist it in resisting any longitudinal strain brought against the hook by the link C.

The longitudinal resistance of the coupling-hook D is also further assisted by the concave form of the front portion of the bumper-head at *a'*, into which the convex surface *a* of the coupling-hook fits, as shown.

The point of the hook D enters a shallow recess formed in the bottom or lower side of the mouth of the bumper-head A, and the forward edge of said hook is beveled or rounded off, so that the entering-link C, when the cars are run together, may raise the said hook and pass into the coupling-box.

The shoulder *f* of the hook D, that the link C rests against in sustaining the draft strain, is inclined or curved, so that the tendency of the draft strain may be to draw the hook downward, and thus hold it securely in place.

*b* is a projection or horn rising from the surface of the interior of the bumper-head, located a short distance from the rear of the coupling-hook D, when the latter is closed.

The front portion of the horn *b* is made in concave form, and is intended to receive and resist the push of the link C when the latter is introduced within the bumper-head.

The concave form of the horn *b*, when the link strikes it, prevents the link from rising against and lifting the coupling-hook D.

The rear portion of the coupling-hook D is elongated beyond the pivot-pin *d*, so as to form a lever, *h*, against the under side of which a spring, E, acts in such a manner as to press the lever *h* upward, thereby forcing and holding down the front end of the coupling-hook D, preventing it from being raised by jarring or jolting, thus forming a security against accidental uncoupling.

The spring E is protected from injury by the peculiar formation of the interior of the bumper-head, which forms a covering-shield for the spring E.

To the upper part of the forward end of the hook D is attached the lower end of the short chain F, the upper end of which is pivoted to the inner end of the lever G, which is pivoted to the body or platform of the car, and its outer end extends out into such a position that it may be conveniently reached, and operated from the side of the car for uncoupling the cars.

The outer part of the lever G passes through a keeper, H, attached to the body or platform of the car, and which is formed, or with which is connected, a double catch, I, to hold the lever G, both when the hook D is down and when it is desired to hold the said hook raised.

J is a lever, the lower end of which is pivoted to the outer part of the lever G, and which extends up into such a position that it may be reached and operated to uncouple the cars from the top of the car.

The lever J passes up through an eye-bolt or keeper attached to the car, to keep the said lever in proper position, and which serves also as a fulcrum to enable the lever G to be detached from the catch I by means of the said lever J.

We do not claim broadly the use of the slotted axis-opening in the draw-hook for the purpose of relieving the axis-pin from strain; but.

Having thus described our invention,

We claim as new and desire to secure by Letters Patent—

1. The bumper-head A, coupling-hook D, spring E, coupling-link C, bar J, lever G, and catch I, arranged as shown and described.

2. The combination of the double catch I with the bar J, lever G, and coupling-hook D, whereby the coupling-hook D may be held in an elevated position, or its undue elevation, by combined weight of said bar and lever, be prevented, all constructed as hereinbefore shown and described.

MANUEL VAN SLYKE.
D. W. WOOD.

Witnesses:
H. D. HAYES,
JOHN BROOKS.